US010891798B2

(12) United States Patent
Guerin

(10) Patent No.: US 10,891,798 B2
(45) Date of Patent: Jan. 12, 2021

(54) SYSTEM AND METHOD FOR DISPLAYING AN ASSET OF AN INTERACTIVE ELECTRONIC TECHNICAL PUBLICATION SYNCHRONOUSLY IN A PLURALITY OF EXTENDED REALITY DISPLAY DEVICES

(71) Applicant: 2689090 Canada Inc., Mirabel (CA)

(72) Inventor: Charles L. Guerin, Montreal (CA)

(73) Assignee: 2689090 Canada Inc., Mirabel (CA)

( * ) Notice: Subject to any disclaimer, the term of this patent is extended or adjusted under 35 U.S.C. 154(b) by 0 days.

(21) Appl. No.: 16/619,313

(22) PCT Filed: Jun. 5, 2018

(86) PCT No.: PCT/CA2018/050672
§ 371 (c)(1),
(2) Date: Dec. 4, 2019

(87) PCT Pub. No.: WO2018/223229
PCT Pub. Date: Dec. 13, 2018

(65) Prior Publication Data
US 2020/0098192 A1 Mar. 26, 2020

Related U.S. Application Data

(60) Provisional application No. 62/515,127, filed on Jun. 5, 2017.

(51) Int. Cl.
*G06T 19/00* (2011.01)
*G06F 9/451* (2018.01)
(Continued)

(52) U.S. Cl.
CPC ............ *G06T 19/006* (2013.01); *G06F 9/451* (2018.02); *G06Q 10/00* (2013.01); *G06T 15/00* (2013.01);
(Continued)

(58) Field of Classification Search
CPC .................................................. G06T 19/006
(Continued)

(56) References Cited

U.S. PATENT DOCUMENTS 7,958,453 B1   6/2011   Taing
8,140,630 B2   3/2012   Jones et al.
(Continued)

FOREIGN PATENT DOCUMENTS

AU   2017203904   1/2018
CN   106096857    11/2016
(Continued)

OTHER PUBLICATIONS

PCT/CA2018/050672 International Search Report and Written Opinion of the International Searching Authority dated Aug. 28, 2018 (11 pages).
(Continued)

*Primary Examiner* — David T Welch
(74) *Attorney, Agent, or Firm* — SmithAmundsen LLC

(57) ABSTRACT

A system for displaying an asset of an interactive electronic technical publication synchronously in a plurality of extended reality display devices. The system comprises a computer having a display displaying the interactive electronic technical publication with a reference to the asset; a multi-channel messaging subsystem; an extended reality application and the plurality of extended reality display devices. The multi-channel messaging subsystem comprises a key-value server and a subscription manager together defining a message broker and using a reactive protocol component allowing clients to subscribe to a channel associated to a conversation. The reactive protocol component used by the message broker allows sending and receiving messages containing at least one of commands, events and property value changes relative to the asset referenced in the
(Continued)

interactive electronic technical publication. The extended reality application module and the plurality of extended reality display device subscribe to the channel.

17 Claims, 14 Drawing Sheets

(51) Int. Cl.
*G06Q 10/00* (2012.01)
*G06T 15/00* (2011.01)
*H04L 12/58* (2006.01)
*H04L 29/08* (2006.01)

(52) U.S. Cl.
CPC ........ *H04L 51/046* (2013.01); *H04L 67/2809* (2013.01); *H04L 67/02* (2013.01)

(58) Field of Classification Search
USPC .......................................................... 345/419
See application file for complete search history.

(56) References Cited

U.S. PATENT DOCUMENTS

| | | | |
|---|---|---|---|
| 8,400,548 B2 | 3/2013 | Bilbrey et al. |
| 8,775,948 B2 | 7/2014 | Ark et al. |
| 9,088,787 B1 | 7/2015 | Smith et al. |
| 9,113,050 B2 | 8/2015 | Laughlin |
| 9,530,250 B2 | 12/2016 | Mazula |
| 9,881,425 B1 | 1/2018 | Scott et al. |
| 2001/0051989 A1 | 12/2001 | Moncreiff |
| 2005/0251462 A1 | 11/2005 | Nykamp |
| 2007/0248261 A1 | 10/2007 | Zhou et al. |
| 2007/0260687 A1 | 11/2007 | Rao et al. |
| 2010/0257463 A1 | 10/2010 | Ducheneaut et al. |
| 2010/0315329 A1 | 12/2010 | Previc et al. |
| 2013/0047098 A1 | 2/2013 | Shuster et al. |
| 2014/0267559 A1 | 9/2014 | Krantz et al. |
| 2016/0093108 A1 | 3/2016 | Mao et al. |
| 2016/0358383 A1 | 12/2016 | Gauglitz et al. |
| 2017/0132568 A1 | 5/2017 | Glunz |
| 2017/0300204 A1 | 10/2017 | Rao |

FOREIGN PATENT DOCUMENTS

| | | |
|---|---|---|
| ES | 2643863 | 11/2017 |
| WO | 2016116820 | 7/2016 |
| WO | 2017222829 | 12/2017 |

OTHER PUBLICATIONS

PCT/CA2018/050672 International Preliminary Report on Patentability dated May 14, 2019 (4 pages).

Artamonov et al, "Structured Design of Interactive Electronic Technical Manuals Eased on Virtual Reality Means," brochure , 7th IFAC Conference on Manufacturing Modelling, Management, and Control, Jun. 19-21, 2013 (pp. 1114-1118).

SYSTEM AND METHOD FOR DISPLAYING AN ASSET OF AN INTERACTIVE ELECTRONIC TECHNICAL PUBLICATION SYNCHRONOUSLY IN A PLURALITY OF EXTENDED REALITY DISPLAY DEVICES

CROSS-REFERENCE TO RELATED APPLICATIONS

This application is a nationalization of and claims priority to PCT/CA2018/050672, filed on Jun. 5, 2018, which claims priority under 35 USC § 119(e) of U.S. provisional patent application 62/515,127 filed on Jun. 5, 2017, each of which is hereby incorporated by reference in its entirety.

TECHNICAL FIELD OF THE INVENTION

The present invention relates to the field of interaction between technical manuals and virtual, augmented and/or mixed reality devices. More particularly, it relates to a system and a method for displaying an asset of an interactive electronic technical publication synchronously in a plurality of extended reality display devices and which allow electronic publications to control and react to user activity when using the extended reality display devices.

BACKGROUND

Many interactive electronic technical publications, especially those in the field of aviation, are created using the S1000D standard. This standard defines a data structure which allows for highly complex documentation to be managed and circulated between companies, suppliers, and end-users. The data structure is modular and allows integrating different modules of information into manuals, including interactive modules. Interactive modules are particularly useful for describing complex 3D parts, as the interactions can make the parts easier for readers to grasp.

Interactive electronic technical publications are commonly published to end-user devices such as tablets and laptop computers. Such devices allow readers to interact with interactive components such as multimedia and 3D models. However, the level of interaction is generally limited, as the interaction is confined to a 2D screen. In order to provide an increased level of interaction, readers can interact with electronic technical manuals using extended reality devices. Know prior art and method allowing such interaction with electronic technical manuals using extended reality devices however tend to suffer form several drawbacks. Amongst others, they only allow a single user to view and control an asset, thereby limiting collaboration between users.

In view of the above, there is a need for an improved system and method for displaying an asset of an interactive electronic technical publication synchronously in a plurality of extended reality display devices which, by virtue of its design and components, would be able to overcome or at least minimize some of the above-discussed prior art concerns.

SUMMARY OF THE INVENTION

In accordance with a first general aspect, there is provided a system for displaying an asset of an interactive electronic technical publication synchronously in a plurality of extended reality display devices. The system comprises a computer having a display displaying the interactive electronic technical publication with a reference to the asset; a content-management system storing the asset referenced in the interactive electronic technical publication; a multi-channel messaging subsystem; an extended reality application and the plurality of extended reality display devices. The multi-channel messaging subsystem comprises a key-value server and a subscription manager together defining a message broker and using a reactive protocol component allowing clients to subscribe to a channel associated to a conversation. The reactive protocol component used by the message broker allows sending and receiving messages containing at least one of commands, events and property value changes relative to the asset referenced in the interactive electronic technical publication. The extended reality application module includes a cross-platform game engine generating a virtualized 3D environment displayable on the plurality of extended reality display devices for rendering the asset referenced in the interactive electronic technical publication and loaded into the cross-platform game engine. The extended reality application module is configured to subscribe to the channel associated to the conversation, to communicate messages corresponding to that channel with the message broker of the multi-channel messaging subsystem. The plurality of extended reality display devices are connected to the extended reality application module and display the virtualized 3D environment generated by the cross-platform game engine thereof. The plurality of extended reality display devices subscribe to the channel associated to the conversation.

In an embodiment, the reactive protocol component used by the message broker of the multi-channel messaging subsystem allows multi-directional communications between the plurality of extended reality display devices, with the display of the asset of the interactive electronic technical publication remaining synchronized therebetween.

In an embodiment, the system further comprises a web server connected to the content-management system, the multi-channel messaging subsystem and the extended reality application module. The web server runs web services allowing to add assets to the system, to manage conversations occurring via the multi-channel messaging subsystem, and to request assets from the content management system.

In an embodiment, the channel associated to the conversation is characterized by a unique pairing code, usable by the clients to subscribe to the channel.

In an embodiment, the interactive electronic technical publication includes at least one asset locator URL, the asset locator URL operating as a trigger for loading the asset referenced in the interactive electronic technical publication into the cross-platform game engine of the extended reality application module.

In an embodiment, the at least one asset locator URL includes information for identifying the web server for accessing the asset and information to identify a unique code associated to the asset referenced by the interactive electronic technical publication.

In an embodiment, the extended reality application module further comprises an environment controller performing subscription to the channel associated to the conversation and communicating the messages corresponding to that channel with the message broker of the multi-channel messaging subsystem.

In accordance with another general aspect, there is further provided a computer implemented method for displaying an asset of an interactive electronic technical publication synchronously in a plurality of extended reality display devices. The method comprises:

uploading and storing the asset referenced in the interactive electronic technical publication;

creating a conversation relative to that asset and shared by the plurality of extended reality display devices, the conversation being created by a message broker using a reactive protocol component allowing the plurality of clients to subscribe to a channel associated to the conversation and sending and receiving messages containing at least one of commands, events and property value changes relative to the asset referenced in the interactive electronic technical publication;

generating a virtualized 3D environment rendering the asset referenced in the interactive electronic technical publication and displayable on the plurality of extended reality display devices, using an extended reality application module;

subscribing the extended reality application module to the conversation to communicate messages corresponding to that channel with the message broker; and displaying the virtualized 3D environment on the plurality of extended reality display devices, the plurality of extended reality display devices subscribing to the channel associated to the conversation and allowing multi-directional communications therebetween over the channel.

In an embodiment, the method further comprises displaying the interactive electronic technical publication with a reference to the asset on a display of a computer.

In an embodiment, the method further comprises triggering the generation of the virtualized 3D environment rendering the asset referenced in the interactive electronic technical publication through selection of an asset locator URL included in the interactive electronic technical publication.

In an embodiment, the channel associated to the conversation is characterized by a pairing code. The method further comprises the step of inputting the pairing code by a user in one of the plurality of extended reality display devices or the computer to subscribe the extended reality application module to the conversation.

In an embodiment, the method further comprises the step of inputting the pairing code by users in each corresponding ones of the plurality of extended reality display devices or the corresponding computer to subscribe each one of the plurality of extended reality display devices to the channel associated to the conversation.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
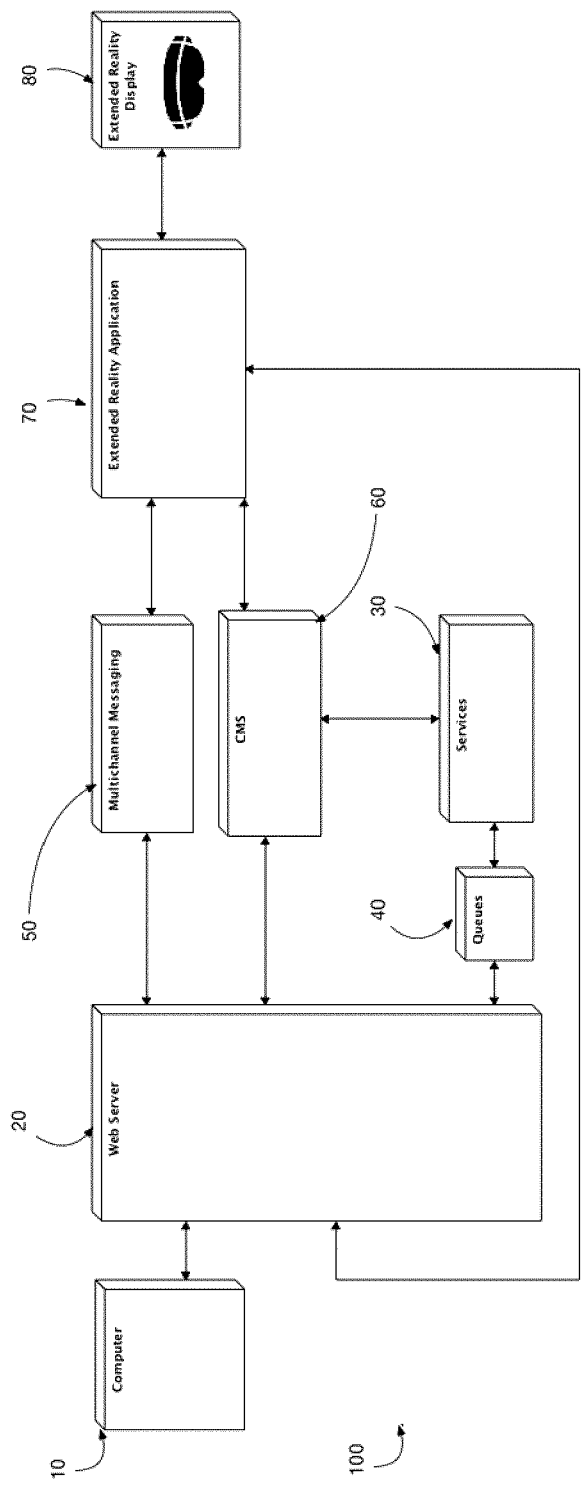
FIG. 1 is a block diagram illustrating the overall system, in accordance with an embodiment.

In the following description, the same numerical references refer to similar elements. The embodiments, geometrical configurations, materials mentioned and/or dimensions shown in the figures or described in the present description are embodiments only, given solely for exemplification purposes.

Moreover, user interfaces depicted in the description are provided for illustrative purposes of features with which user interaction is possible to operate the system described herein and do not represent product appearance or design requirements.

Furthermore, although the embodiments of the system for management of interactive electronic technical publications in extended reality display devices and corresponding parts thereof consist of certain configurations as explained and illustrated herein, not all of these components are essential and thus should not be taken in their restrictive sense. It is to be understood, as also apparent to a person skilled in the art, that other suitable components and cooperation therein between, as well as other suitable configurations, can be used for the system for management of interactive electronic technical publications in extended reality display devices. Moreover, although the associated method for management of interactive electronic technical publications in extended reality display devices includes steps as explained and illustrated herein, not all of these steps are essential and thus should not be taken in their restrictive sense. that It will be appreciated that the steps of the method for management of interactive electronic technical publications in extended reality display devices described herein can be performed in the described order, or in any suitable order.

Many of the software-related terms used in the present description are defined by Roger S. Pressman, Ph. D, in his book, "SOFTWARE ENGINEERING: A Practitioner's Approach", 8th edition published by McGraw-Hill Book Company, in 2014, which book is incorporated herein by reference.

Several software-related terms used in the present description are defined by Gamma, Helm, Johnson and Vlissides in their book "Design Patterns: Elements of Reusable Object-Oriented Software"[Addison-Wesley, 1994]) which book is incorporated herein by reference.

Also known in the art are various technological terms including:

"virtual reality" (Sutherland, Ivan, "The Ultimate Display" (PDF). Proceedings of IFIP 65. 2: 506-508, 1965);

"augmented reality" (Steuer, Jonathan, Defining Virtual Reality: Dimensions Determining Telepresence, Department of Communication, Stanford University, 15 Oct. 1993);

"mediated reality" ("Wearable, Tetherless, Computer-Mediated Reality", Technical Report #260, M. I. T. Medial Lab Perceptual Computing Section, Cambridge, Mass., 1994);

"mixed reality" (Fleischmann, Monika; Strauss, Wolfgang (eds.) (2001). Proceedings of "CAST01//Living in Mixed Realities" Intl. Conf. On Communication of Art, Science and Technology, Fraunhofer IMK 2001, 401. ISSN 1618-1379 (Print), ISSN 1618-1387; and "extended reality" (Vinod Baya; Erik Sherman. "The road ahead for augmented reality). As the term "extended reality" encompasses the domain of virtual, augmented, mediated, and mixed reality, the term is most applicable to the present description, as will be described in more details below.

Also known in the art is the S1000D technical specification. S1000D is an international specification for the procurement and production of technical publications whose glossary as specified in the "S1000D™ Issue 4. 2 specification document" (www.s1000d.org) is incorporated herein by reference.

Moreover, the term "asset" is used in the present description to indicate digital content that an author of an interactive electronic technical publication seeks to include in an extended reality view of a technical content. It is also used to define digital content that is part of a virtualized 3D environment rendered in a cross-platform game engine.

Figure 2:
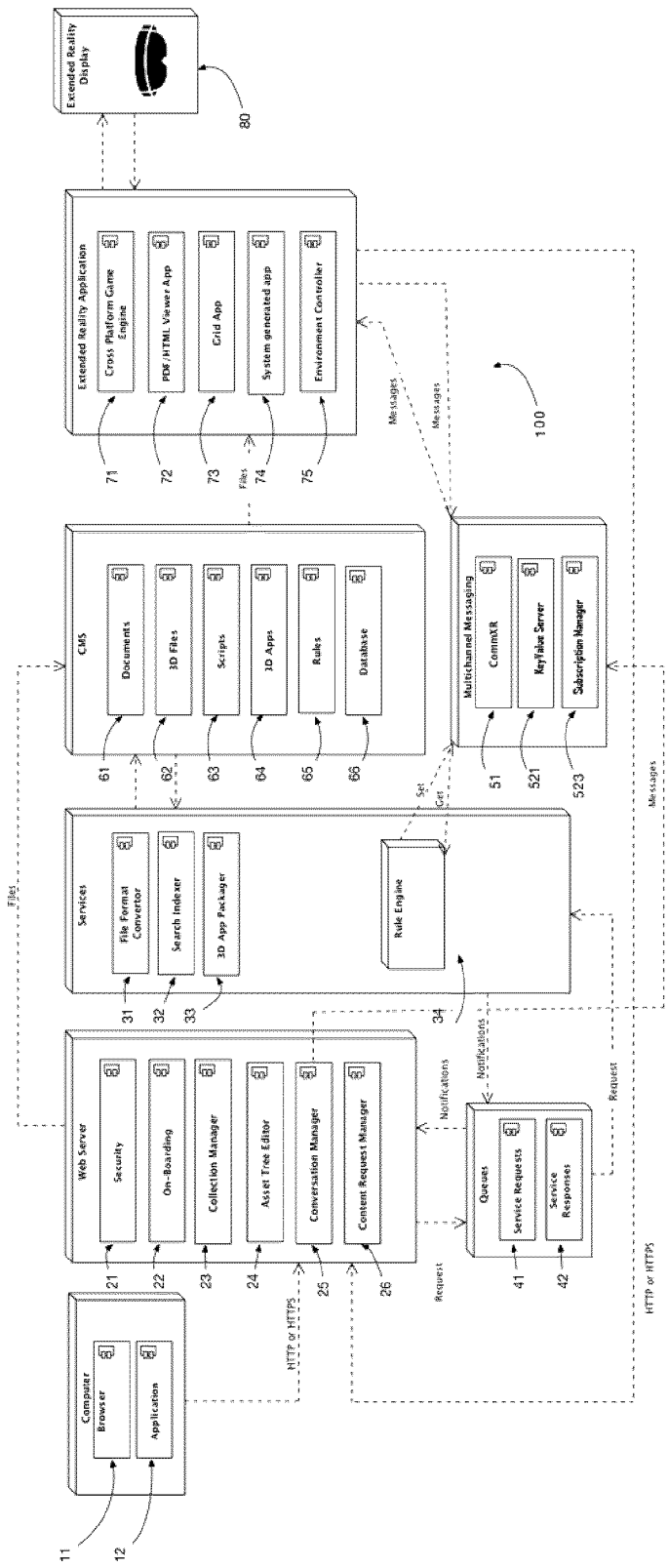
FIG. 2 is a detailed block diagram illustrating the system of FIG. 1 detailing the subcomponents which together makeup each component.

Components of the System for Management of Interactive Electronic Technical Publications in Extended Reality Display Devices Referring generally to FIGS. 1 and 2, in an embodiment, the system 100 includes a computer 10, a web server 20, a multi-channel messaging subsystem 50, queues 40, a services module 30 including a rules engine 34, a content-management system (CMS) 60, an extended reality application module 70 and extended reality display devices 80. The above-mentioned components are in data communication to provide the desired functionalities of the system 100. For example and without being limitative, such functionalities include triggering the display of textual, graphic and 3D displays within extended reality display devices, the display of technical manuals in extended reality display devices and the creation of animated and controlled display of 3D imagery, within extended reality display devices 80, as an authoring tool. Advantageously, the multi-channel messaging subsystem 50, which will be described in more details below, also allows a multiplicity of extended reality display devices 80 to be controlled from a single extended reality display device 80, or from a single electronic manual.

In the embodiment shown in FIG. 1, the computer 10 is connected to the web server 20 via a bidirectional HTTP communication to interact with web services and web applications (not shown) of the web server 20. The extended reality application module 70 is also connected to the web server 20 to interact with web services (not shown), such as, for loading an asset (or an asset bundle), and is connected to the multi-channel messaging subsystem 50, in order to communicate with the extended reality display devices 80. The services module 30 is connected to the web server 20 to launch asynchronous or synchronous operations and to the queues 40 to read new commands from command queues and send responses to response queues (not shown). The web server 20 is also connected to the CMS 60 to store/retrieve files, assets, data and metadata from the database thereof. 66. The multi-channel messaging subsystem 50 is connected to the web server 20, the extended reality application 70, the services module 30 and the CMS 60.

It will be understood that, in alternative embodiments (not shown), the multi-channel messaging subsystem 50 could connect to other devices including control panels, IOT (internet of thing) devices, meters, sensors, and other user interfaces that a technical publication author deems a requirement for an interactive electronic technical publication. As will be described in more details below, the devices communicating through the multi-channel messaging subsystem 50 must however communicate using a common reactive protocol 51 referred herein as the CommXR protocol, which will be described in more details below.

In another alternative embodiment (not shown), the services module 30 (which includes the rules engine 34 can also be connected to the multi-channel messaging subsystem 50 to respond and react to property changes, commands and triggers from the computer 10, the extended reality application module 70 and any other device connected to the multi-channel messaging 50, as will be described in more details below.

The computer 10 can be any type of electronic device for storing and processing data, and including a central processing unit, a display, a memory, a storage and an operating system stored in the memory thereof. For example and without being limitative, the computer 10 can be a desktop personal computer or a mobile computing device such as, a tablet, a mobile phone, a laptop, or the like, and capable of running applications loaded and launched by the operating system.

In an embodiment of the system 100, the computer 10 is used to display an interactive electronic technical publication (or technical manual) which links, via the web server 20, to the extended reality display devices 80 and to interact with web pages (not shown) stored on the web server 20 and which controls the overall system 100. Hence, in an embodiment, the computer 10 includes software stored in the memory thereof and capable of displaying web pages, such as a web browser 11. In an alternative embodiment, the computer can include applications 12 stored in the memory thereof and capable of performing functions of an Interactive technical publication, including but not limited to, hypertext linking.

The web server 20 is also an electronic device for storing and processing data. The web server 20 runs web services and web sites used, for example and without being limitative and as will be described in more details below, to configure the system 100, to add assets to the system 100, to manage collections of objects, to configure part assembly data structures (referred to hereinbelow as "asset trees"), to manage conversations occurring via the multi-channel messaging subsystem 50, to configure rules in the rules engine 34 of the services module 30 and/or to request content from the CMS 60.

In an embodiment, the web server 20 is configured to deliver web pages (not shown) to the computer 10 using HTML 1.1 or higher as a basic protocol and to run a variety of software modules and applications stored in a memory thereof, each performing specific operations to communicate with other components of the system 100. In an embodiment, the web server 20 can communicate with the computer 10 using either secure communication protocols such as TLS, SSL or open text protocols such as HTTP.

The services module 30 is a module configured to continuously run applications which can be referred to as "services". Services are continuous running processes that read messages from a queue and write messages back to a queue after performing an operation. The services typically respond to start, stop, and restart messages. Start begins the service operation. Stop ends the service operation. Restart stops and then restarts a service. For example and without being limitative, in the system 100, the services module 30 is configured to run services which can read information from the queues 40 and perform asynchronous operations such as, for example, file format conversion, packaging 3D objects into multi-platform "apps" running simultaneously on the extended reality display, or the like.

More particularly, in an embodiment, a service performing file format conversion is configured to identify a type of 3D object represented by one or more files, identify a library of algorithms for converting the file format to formats with reduced numbers of polygon (to allow "low poly" devices such as typical consumer virtual reality headsets to be able to rapidly display the object), and/or include a thumbnail object generator to generate small versions of the part for user interface purposes, and a packager that merges parts, materials, and scripts into a cohesive loadable package.

The queues 40 are data and communications structures which allow commands from the web server 20 to be processed asynchronously as background processes by the services module 30. The queues 40 allow job requests to be sent to the services module 30 as well as notifications to be received back from the services module 30 in the case of failures, errors, or important status messages.

In an embodiment, the queues can include a database, a file system and/or a communication buffer in which a command or data object is stored. In an embodiment, the queues 40 are of the first-in, first-out (FIFO) type.

The multi-channel messaging subsystem 50 is a subsystem including a key-value server 521 and a subscription manager 523 using a reactive protocol component 51 identified herein as CommXR, which allows sending and receiving commands, setting and receiving property values, and triggering and responding to events, regarding an asset displayable in a 3D virtualized environment. As will be described in more details below, the multi-channel communication module 50 hence allows multiple extended reality display devices 80 to synchronize their displays, reliably send data between them, and to provide the mechanism by which the extended reality display devices 80 can communicate bi-directionally with the computer 10 running an interactive electronic publication application or manual and multi-directionally therebetween.

As will also be described in more details below, the multi-channel communication module 50 allows the system 100 to provide the ability to link manuals displayed on computers 10 with multiple extended reality displays 80, in bi-directional communication. The multi-channel communication module 50 of the system 100 also allows interactive electronic publications or manuals to be displayed inside an extended reality environment generated by the extended reality application module 70 and displayed on the extended reality displays 80.

In an embodiment, the multi-channel communication module 50, uses a key-value server 521 and a subscription manager 523 which together define a "message broker") such as, for example and without being limitative REDIS or Google firebase, in combination with a proprietary reactive protocol 51 (referred herein as the CommXR protocol), allowing multiple clients accessing the key-value server 521 to subscribe to messages containing commands, events or property value changes. The CommXR protocol 51 of the multi-channel communication module 50 is also configured to allow clients to send commands, events or property value changes over the above described channel.

In the course of the present description the term "client" is used to refer to a component (the client) requesting a service or resource from another component, such as, in the present case, the key-value server 521.

The content management system (CMS) 60 is a structured repository for storing files in a version-controlled manner. In an embodiment, the CMS 60 includes a common file system and a database 66 to store meta-data about the files stored thereon. For example and without being limitative, the CMS 60 of the system 100 can have stored thereon 3D models (also referred herein as assets), scripts, rules, documents, or the like, used by the components of the system 100 for proper functioning thereof. In an embodiment, when a new version of an asset is added into the system 100, all files related to previous versions of the same asset are backed up such that, any version of the asset can be accessed subsequently.

As mentioned above, the CMS 60 includes a database 66 storing metadata about files and other entities stored in the system 100. In an embodiment, the files can be stored in the database 66 of the CMS 60, using common file storage methods such as FAT32, NTFS, Unix subsystems, or the like. In an embodiment, each file is addressed by a unique uniform resource identifier (URI) and folders are assigned using a structure that identifies the users account, the component to be stored, and version information.

The extended reality application module 70 is a module including a cross-platform game engine 71 (i.e. a system designed to allow users to display and interact with assets in a virtualized 3D environment, using a variety of 2D and 3D management devices). Examples of the type of game engine that can be used for the cross-platform game engine 71 include Unity 3D game engine (by Unity Technologies Inc), Unreal Engine (by Epic Games Inc), or the likes. In an embodiment, the cross-platform game engine 71 is configured to import various 3D file formats under the control of a scripting language running on multiple operating systems. The cross-platform game engine 71 performs rendering of 3D objects in real-time on extended reality display devices 80 and generates the code to create applications on those devices. The applications created on the extended reality display devices 80, in turn load files, while running under the control of scripts. The scripting language on the cross-platform game engine 71 should be capable of accessing a network such as Internet, for example by calling an HTTP protocol web service.

In an embodiment, the extended reality application module 70 also includes a PDF/HTML Viewer app 72, winch will be described in more details below. The PDF/HTML Viewer app 72 displays electronic technical publications in PDF or HTML format as well as common image formats, and a Grid app 73 which allows browsing and searching for content from the documents 61, 3D files 62 and/or scripts 63 from the CMS 60.

In the embodiment shown, the extended reality application also includes system generated apps 74 and an environment controller 75.

The system generated apps 74 are components that run under the control of the extended reality application module 70 and are generated by the 3D app packager 33 of the services module 30. The 3D app packager 33 is configured to combine assets, scripts and other materials together to form an application of the extended reality application module 70.

The environment controller 75 acts a communication controller to receive and send information to/from the multi-channel messaging subsystem 50, to enact programmer behavior within the extended reality application 70. In an embodiment, functions of the environment controller 75 also manage the instantiation, communication and/or control of the system generated apps 74, the PDF/HTML viewer app 72, and/or the Grid app 73.

The extended reality display devices 80 includes any device that displays 3D or 2D objects in a virtual, augmented or mixed reality context and is capable of interfacing with an extended reality application using the cross-platform game engine 71, such as, for example and without being limitative, virtual reality headsets and mobile devices ("VR"), augmented reality headsets and devices ("AR"), and mixed reality devices ("MR"). It also includes flat screen technology devices such as mobile and tablet phone displays which can use front-view cameras to incorporate augmented reality features. Furthermore, the extended reality display devices 80 can include glasses, goggles, implanted devices, actuators, indicators, sensors and/or wands.

As the above described devices can have different sensors and control systems including gesture sensors, haptic sensors and actuators, laser and sonar measurement sensors, force and motion sensing wands, video motion capture, infrared sensors and a multiplicity of other features and subsystems, the present description uses a vocabulary referencing what a user does rather than how they do it. Therefore, for purposes of the present description, expressions such as "clicked", "pressed", "touched" as written herein are meant to be interpreted as actions taken by the user to interact with a 3D model represented in an extended reality display device 80 rather than exact specifications as to which specific control or sensor is actuated.

Operation of the System for Management of Interactive Electronic Technical Publications in Extended Reality Display Devices In operation, the system 100 allows a user to initially create a digital account via a user interface, which will be linked to the assets associated to that user account. The purpose of the user account is to limit access of the assets to the corresponding user account, as a security measure and for purposes of controlling content ownership and digital rights management.

Figure 3:
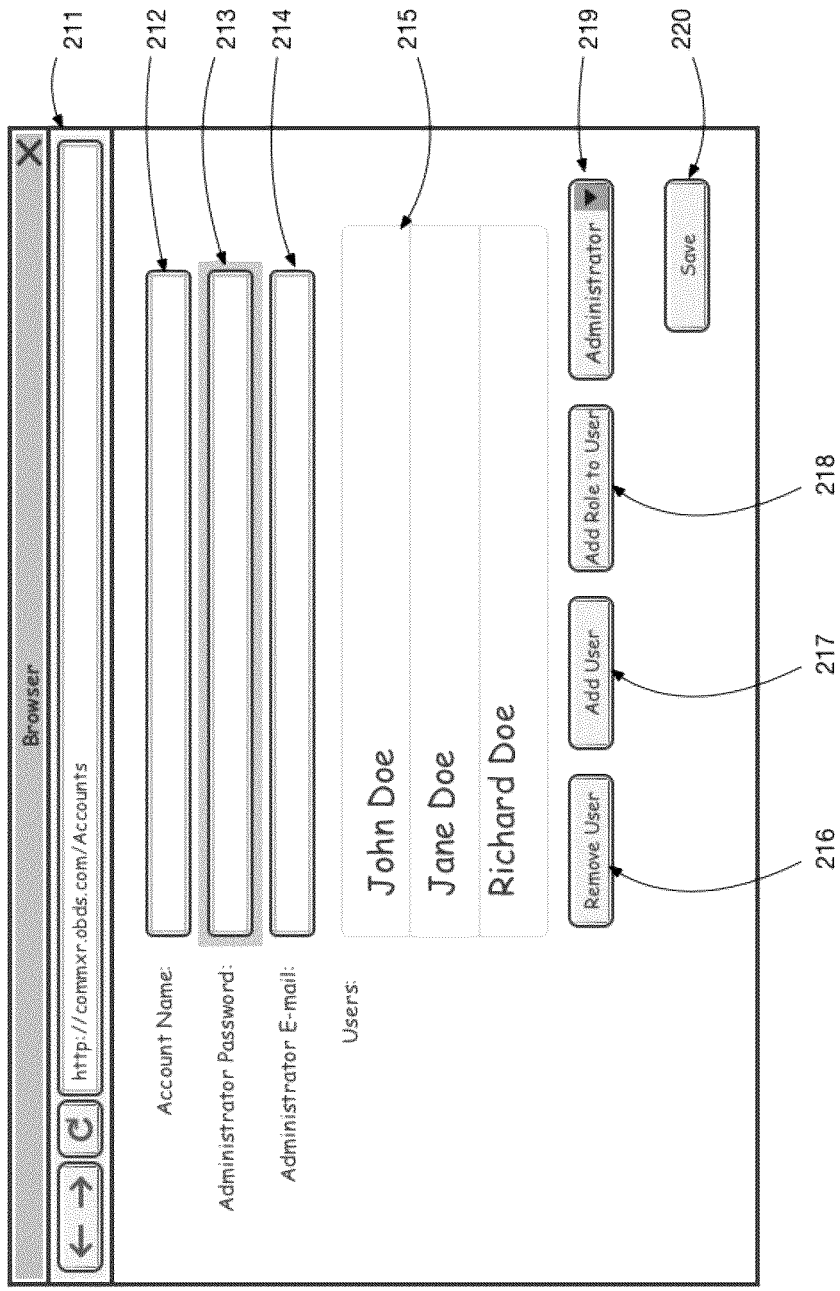
FIG. 3 is a user interface screen used to create an account, in accordance with an embodiment.

FIG. 3 shows an account information form 211, in accordance with an embodiment, which allows the entry of account configuration information from the user. For example and without being limitative, the account information form 211 can allow entry of account identification information 212, 213, 214, adding and/or removing users from the account items 215, 216, 217, assigning each user of the account one or more roles 218, 219, and saving the information when the procedure is finished 220. Each one of the roles constitutes a permission policy that describes rights associated to the user, such as if they can access assets and whether they can create, read, update, delete or modify the structure of entities for them.

In an embodiment the following roles can be defined within the system 100, but one skilled in the art will understand that, in alternative embodiments other roles could be defined:

- "Admin" user which has permission to change any data stored in the system 100. Users with an "Admin" role can also add additional users and define the roles of each user to include terms such as "Admin", "Author", "Editor", "Viewer", "Teacher" or "Student".
- "Authors" user which can add 3D-related assets (i.e. 3d files and other supporting documents) to the system 100, and edit various hierarchal trees in the system 100 used to categorize groups of assets. As will be described in more details below, Authors can also define "Scenes" which represent the view of a combination of groups of assets, lighting and other information to create a particular view.
- "Editors" which have the permission to place assets into scenes, add or remove labels and callouts (which are used to display information about an asset), control basic lighting elements and manage configuration information concerning each scene. "Editors" have the permission to correct text in any asset description but cannot remove assets.
- Viewers which can view and control Scenes, assets and asset assemblies on one device.
- "Teachers" which have the permission to begin multi-user conversations via the system.
- "Students" which can view assets in the extended reality view, but under control of the "Teacher" who will control the loading, appearance and overall control of the assets being viewed by the Student.

It will be understood that a user can be assigned one or more of the above-described roles. For example, and without being limitative, a user can be assigned the roles of Author, Teacher and Editor, and would therefore be granted the rights associated to all of these roles.

Figure 4:
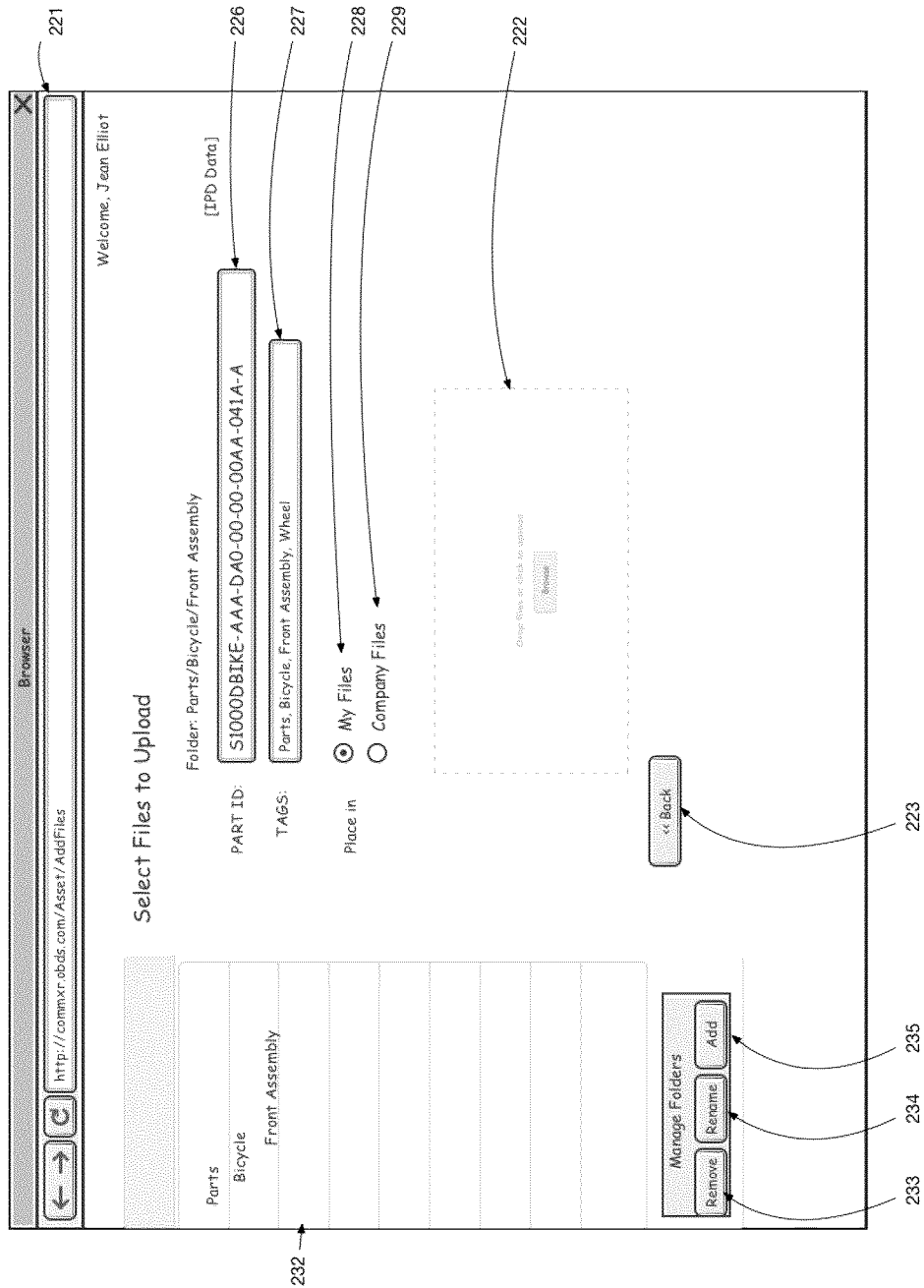
FIG. 4 is a user interface screen to upload files and assign tags via an asset tree, in accordance with an embodiment.
Figure 5:
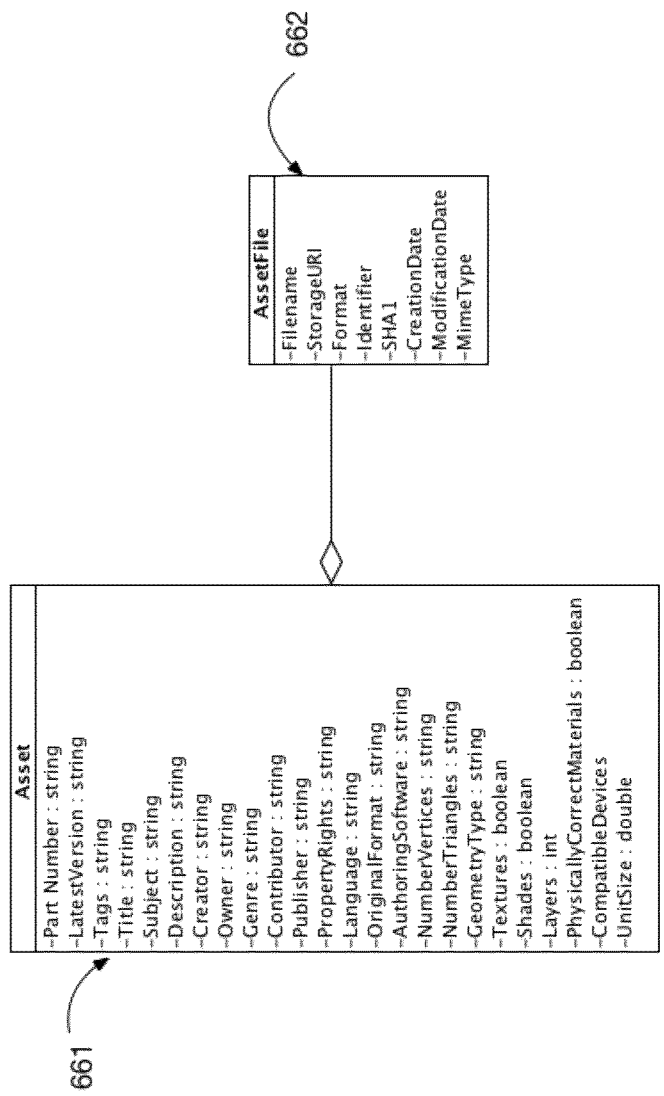
FIG. 5 is a UML class diagram illustrating a multi-file asset as stored in a document, document database or relational database structure, in accordance with an embodiment.
Figure 6:
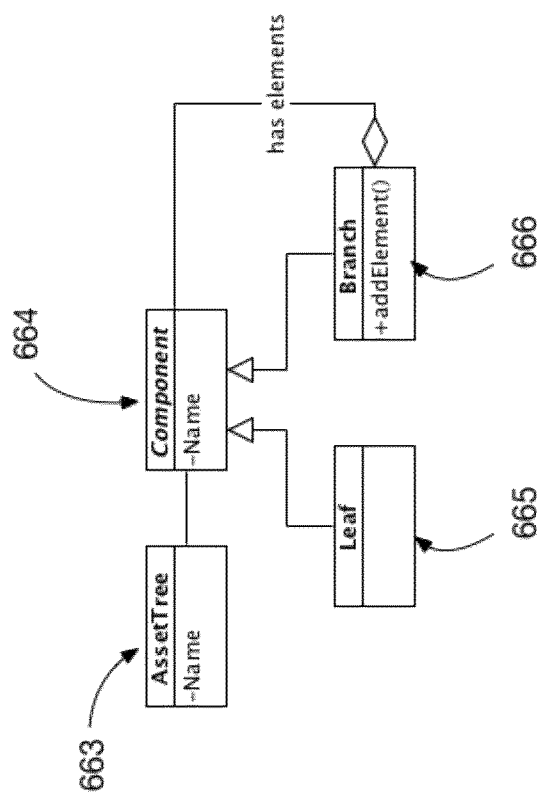
FIG. 6 is a UML class diagram illustrating an asset tree which can be used in the system, in accordance with an embodiment.

Referring to FIGS. 4 to 6, once a user has a user account, the user can add an asset to the system 100, using an "Add Asset" user interface 221. An "Add Asset" user interface 221, in accordance with an embodiment, is shown in FIG. 4. The "Add Asset" user interface 221 allows selection of an "Asset Tree" 232, in which the asset is to be inserted and a branch of that Asset Tree 232 to which the asset is to be added. The "Add Asset" user interface 221 also allows management of the Asset Tree by adding 235, removing 233 or renaming 234 branches (i.e. nodes) of the tree.

In the course of the present description, the term "Asset Tree" is used to refer to a data element based on a hierarchic tree structure used to represent taxonomic knowledge where the branches of the tree represent either categories or structural design of a technical system. Each branch is linked to the next branch in a Parent-Child relationship, and the name of each branch is used to categorize one or more assets. In the course of the present description, equivalent terms can be used and refer to an Asset Tree such as, for example: "Parts List", "Parts Tree", "Library of Parts", "My Parts", "Account Parts", or the like. FIG. 6 shows an exemplary representation of an Asset Tree, in accordance with an embodiment.

The "Add Asset" user interface 221 allows addition of a file using one of drag and drop or browsing 222. Users can specify tags 227, which are keywords that can be used to search for the asset by a text search engine. In an embodiment, tags are partially correlated to the asset trees 232, in that Tags can be automatically assigned when the user selects branches on the asset tree 232.

Referring to FIG. 5, in an embodiment, the assets are represented in the system 100 by a data object "Asset" 661, that contains all known metadata about the asset, tags and references that define its relation to the overall system structure and aid in locating it when searching for it in a database. The data object "Asset" 661 relative to a stored asset, can be stored in a database 66 of the CMS 60, such as, for example and without being limitative, an SQL database, a relational database, an object database, a document database, a graph database or a key/value database. In an embodiment, the data object "Asset" 661 is stored in an SQL relational database. The data object "Asset" 661 includes a variety of metadata information used to determine asset ownership rights, 3D properties, searchable fields and the like. In an embodiment, the data object "Asset" 661 is linked to an Asset File table 662 such that multiple files can be related to each asset. In an embodiment, the Asset File table 662 contains the information required to ensure data integrity, locate the files in a storage device, and identify the type and format of the file to enable file format conversion and network delivery of the file.

In an embodiment, most properties of the data object "Asset" 661 identified in FIG. 5 are optional, with the Part Number, Latest Version and its relation to the AssetFile objects being the only mandatory properties that must be specified in order for the system 100 to function in its basic functionality.

For more advanced functionality, extra metadata, digital rights information, textual information and 3D file information can be used to enhance text search, digital rights management and advanced file conversion functions within the system 100.

Properties of the data object "Asset" 661 as shown in FIG. 3, in accordance with an embodiment, are summarized hereinbelow:

- "Part Number" is a unique number used to locate the asset within the system 100.
- "Latest version" is an identifier (such as a string, a real number or an integer) used to identify the version of the asset. In an embodiment, it is an automatically incremented integer which increments whenever an asset with the same Part Number is added to the system.
- "Tags" is a comma separated list of strings that can be formulated to associate the asset with one or more Asset Trees, which are used to categorize the relationship of the asset as part of a larger overall component. For example and without being limitative, the "Tags" can be keywords entered by a user and used by a search system to enable keyword searches.
- "Title, Subject, Description" are properties used to provide additional metainformation as to the content in searchable and displayable form.
- "Creator, Owner, Contributor, Publisher, Property Rights, Authoring Software, Language, and Genre" are properties used to establish the digital rights, copyright and moral right ownership of the asset.
- "Number of Vertices, NumberTriangles, GeometryType, Textures, Shades, Layers, Physically Correct materials and Unitsize" are properties metadata used to describe various properties of the asset. Such metadata can for example be relevant to functions of the rules engine 34 of the services module 30 and/or the development of 3D format conversion expert systems.

In an embodiment, the Asset File table 662 includes the basic filename, storage location, file format, identifier (a guaranteed unique ID), SHA1 file signature (used to ensure data integrity), creation and codification data and MimeType (used to aid the web server 20 in delivering the file to the various subsystems). It will be understood that an asset can have multiple files attached to it, and hence file-related metadata is stored along with the information stored in the Asset File table 662.

The result of the asset addition procedure is that the asset is defined in a database by its metadata, and all files representing the 3D model and supplemental files (material, texture, pdf, text, etc.) are stored.

In an embodiment the files representing the 3D model and supplemental files (material, texture, pdf, text, etc.) are stored in a temporary directory awaiting conversion of the original 3D model. Indeed, in an embodiment, files added by the user need to be converted from their source format to a new format that can be loaded by the cross-platform game engine 71 of the extended reality application 70. In an embodiment, such conversion is performed by the file format convertor 31 of the services module 30 (i.e. a component which convert 3D file formats). One skilled in the art will understand that several processes or methods can be used to perform such conversion of the primary 3D model.

Figure 7:
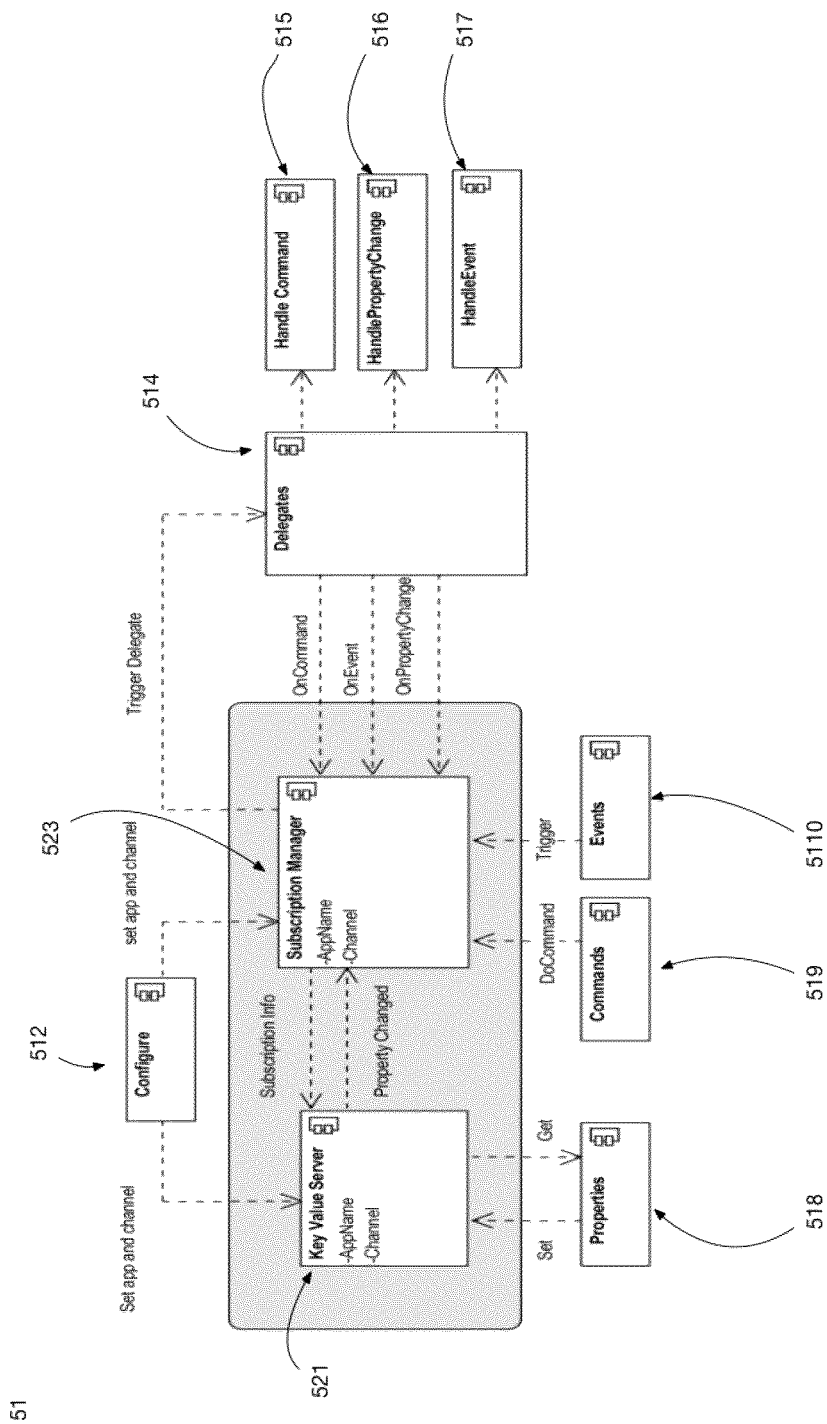
FIG. 7 is a block diagram illustrating a multi-channel messaging subsystem of the system, in accordance with an embodiment.
Figure 8:
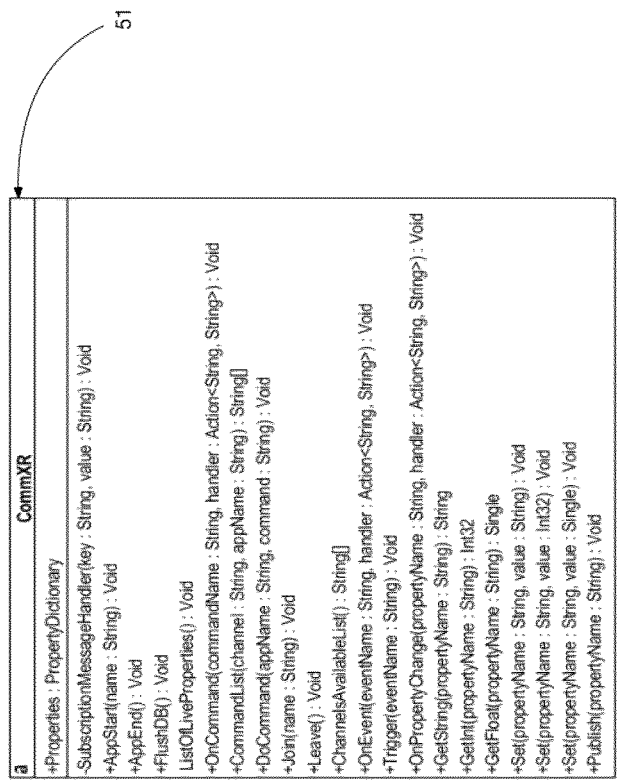
FIG. 8 is a UML class diagram illustrating a public interface of the CommXR protocol component, in accordance with an embodiment.

Now referring to FIGS. 7 and 8, there is shown management of interaction by the multi-channel messaging subsystem 50, in accordance with an embodiment. As mentioned above, the multi-channel messaging subsystem 50 includes a key-value server 521 and a subscription manager 523. These two elements, when combined with a method of storing keys in the key-value system that incorporates both channel information and identify information, combine to form a message broker by which messages can be sent on a known channel and listened to by a specific client (e.g. device, software application or asset). In other words, the key-value server 521 and the subscription manager 523 together define a message broker which uses a reactive protocol component 51 referred herein as "CommXR" and shown in FIG. 8 to allow clients to subscribe to a channel associated to a conversation and to send and receive messages containing at least one of commands, events and property value changes relative to the asset referenced in the interactive electronic technical publication, for managing properties of the asset.

In the course of the present document, the term "message" is used to refer to communication vessel using the key/value model to specify a target entity and a value for that target entity to change to. Hence, the reactive protocol component CommXR 51 leverages key/value pairs using the key to describe which conversation the message relates to, which object and (if setting a property) which property is the target entity. The value is a parameter that relates to the target entity. Key-value servers 521 that offer a subscribe/publish mechanism can therefore subscribe to a "key" of the reactive protocol component CommXR 51 and by defining the key as either a command, property or event, respond in the appropriate manner by either running a command, setting a property or triggering an event.

In an embodiment, the CommXR component 51 first configures a communication 512 to establish an Internet connection with the multi-channel messaging subsystem 50.

In an embodiment key values in the system are stored in the format: <Channel>+"."+<Part Number>+"."+<Entity>. Hence, for example, if the value to be stored is a property called "Color" to be set to all devices listening to channel "1" and specifically to an asset with the Part Number "Bicycle Wheel", the key would be created as: 1+"."+"Bicycle Wheel"+"."+"Color", which would become: 1.BicycleWheel.Color.

The subscription manager 523 allows clients familiar with the protocol of the reactive protocol component CommXR 51, to "subscribe" to this property, through the channel.

Hence, any time the value changed for this key, the multi-channel messaging subsystem 50 can "push" the value to the client. In an embodiment, the <Entity> items include property names, commands, and events, all of which can be subscribed to. When subscribed, a client uses its reactive protocol component CommXR 51 therein, to assign a delegate function to handle the type of entity involved—property, command or event.

In an embodiment, the reactive protocol component CommXR 51 includes methods to choose a channel ("Join"), name a client's app and begin communication ("AppStart"), set/get a property ("Set and Get"), launch a remote procedure ("DoCommand"), trigger an event ("Trigger") as well as assign delegates to handle incoming messages from subscribe key/value pairs ("OnCommand/OnEvent/OnPropertyChanged").

Figure 9:
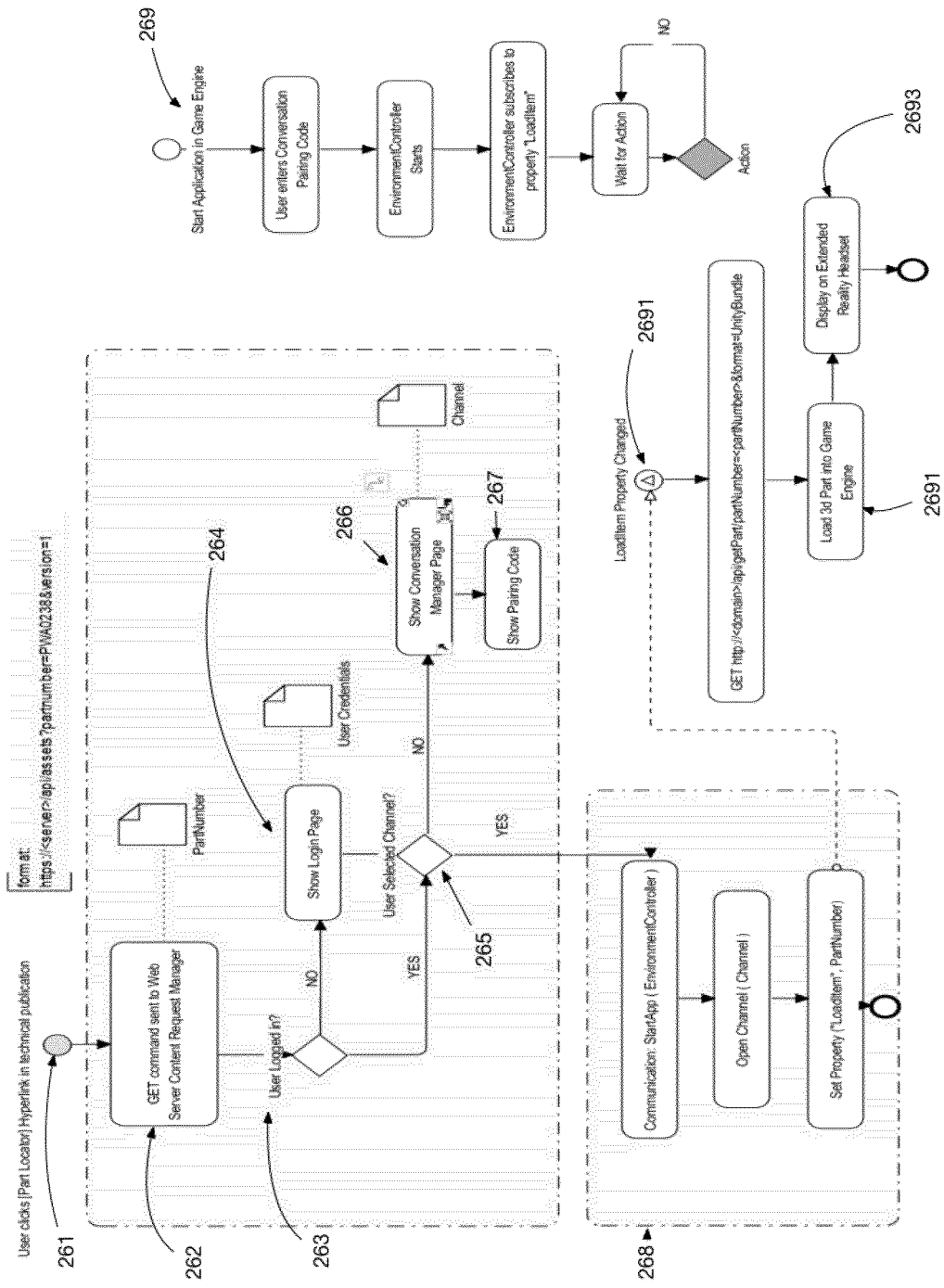
FIG. 9 is a flowchart illustrating a process where a hyperlink triggered by a user, in an interactive electronic technical publication causes an asset to be loaded in a virtualized 3D environment displayable on an extended reality display device.
Figure 10:
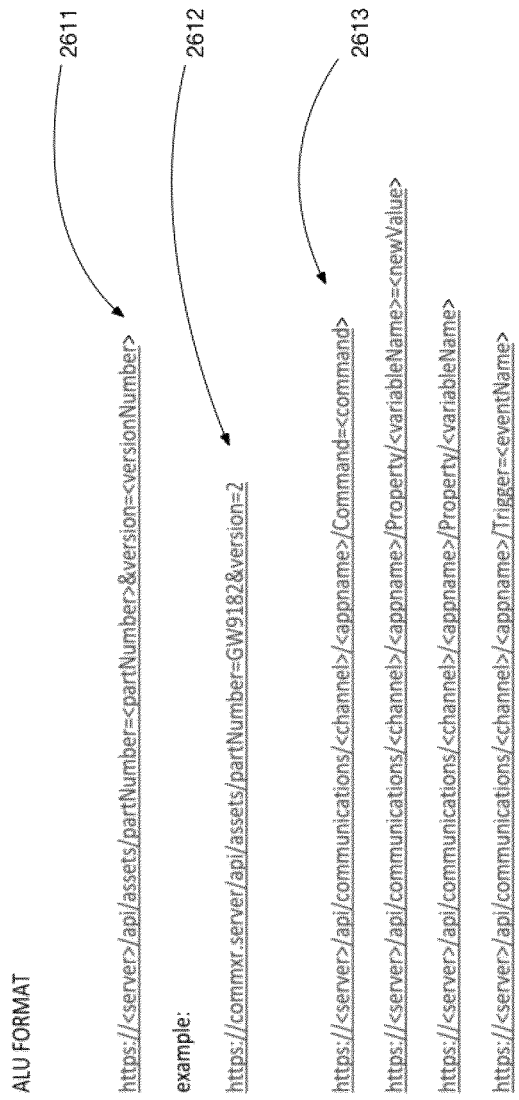
FIG. 10 shows plurality of URLs defining ASSET LOCATOR URLs ("ALU"), in accordance with an embodiment.

Now referring to FIGS. 9 and 10, a flow of actions by which an asset (which can have been previously converted into an "asset bundle" suitable to the cross-platform game engine 71 by the file format convertor 31 of the services module 30) and stored in the content management system 60 can be displayed on an extended reality display device 80. In the embodiment shown, the asset can be displayed on an extended reality display device 80, following activation (or clicking onto) an asset locator URL (ALU) 2611, 2612, 2613.

In an embodiment (see 2611, 2612), an ALU is a URL made up of two parts, one to identify a web server accessing the file relative to the asset, and the second to identify a unique code to identify the specific asset. In an embodiment, the ALU can also contain a version number.

In an alternative embodiment, the ALU can also contain a code identifying a unique asset bundle, asset library, scene, lighting object, environment control object, or software component, all of which can be loaded in a virtualized 3D environment generated by the extended reality application module 70. In another alternative embodiment (see 2613), an ALU can also contain a command, property name, or event name that can query or send data to the multi-channel messaging subsystem 50.

The purpose of the ALU is to act as a central launch point for a series of actions that ultimately load the asset into the extended reality display device 80 as shown in FIG. 9. Since an ALU is a standard URL that can be included in any interactive electronic technical publication, HTML document, PDF file (or a multiplicity of other formats that allow URL embedding), it acts as a simple trigger for the task of loading assets into a remote or local extended reality application (i.e. into the cross-platform game engine 71 of the extended reality application module 70).

In an embodiment, when an ALU is clicked 261, an HTTP GET command is sent to the web server 20 containing at minimum, a Part Number to identify an asset contained within the CMS 262. These actions include logging into the system 100 if the user is not presently logged in 264, starting a conversation (that can be shared by multiple extended reality display device 80), pairing that conversation with the extended reality display device 80 by providing a shared pairing code 267, and ultimately loading of the asset onto the multiples extended reality display devices 80 and subsequent multi-directional communications between the extended reality display devices 2691.

In more detail, the ALU represents a unique URL to be included as part of the content of the interactive electronic technical publication. When an ALU hyperlink is clicked 261 from within an interactive electronic technical publication, in an embodiment, the following sequence of actions occur.

Figure 11:
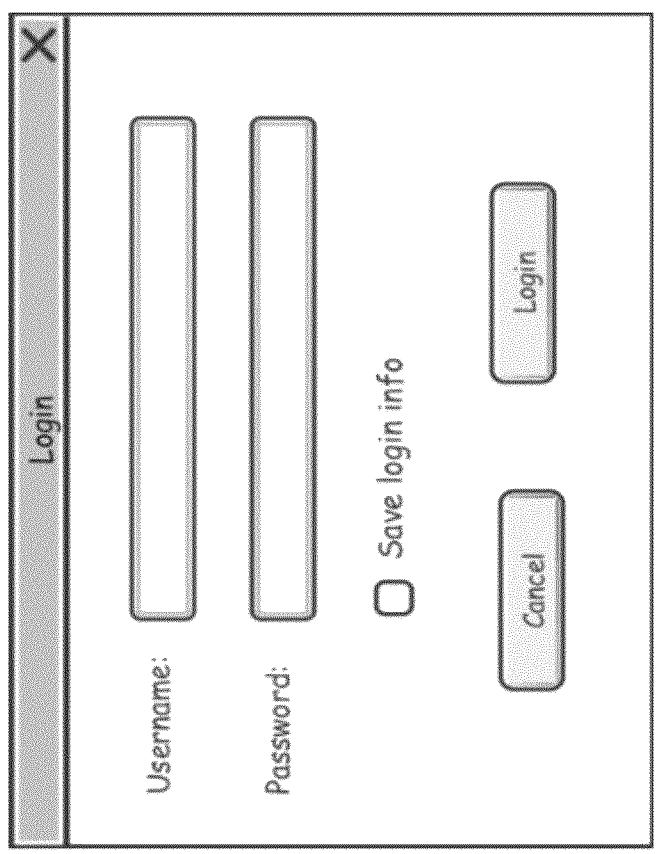
FIG. 11 is a user interface screen of a basic login screen, in accordance with an embodiment.
Figure 12:
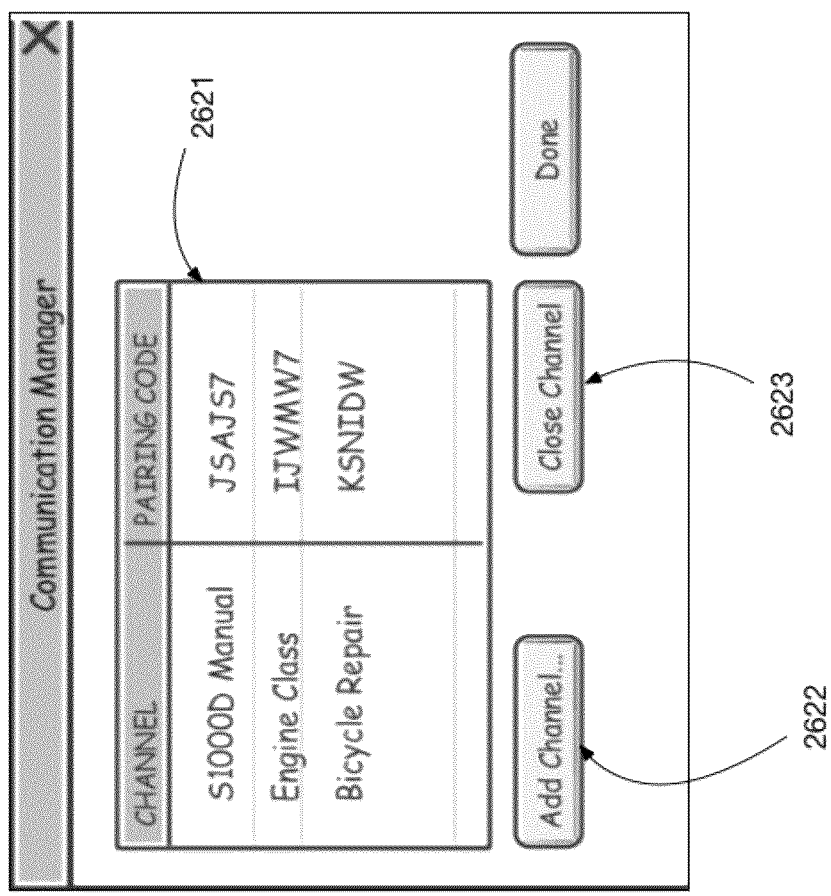
FIG. 12 is a user interface screen representative of the type of data required in a user interface to control communication manager channels and pairing codes, in accordance with an embodiment.

1. If a user is not logged in 263, a login dialog 264 is displayed on the computer (see FIG. 11) to request the user to enter security credentials. If the user is already logged in, this step is skipped.
2. If the user is not in a conversation 265, a conversation is initiated for that asset by displaying a "Conversation Manager" dialog (see FIG. 12) to allow the user to identify the conversation and generate a unique pairing code 267 that is linked to the conversation name, or to allow the user to select a pre-existing conversation that has already started and is still running. Once selected, the user is subscribed to the conversation.

Figure 13:
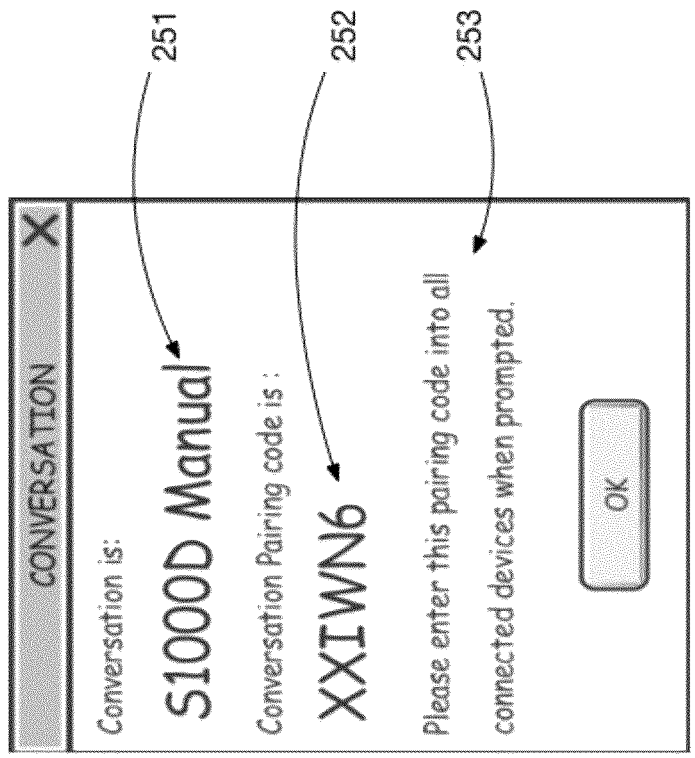
FIG. 13 is a user interface screen representative of a type of pairing code display, in accordance with an embodiment.

For example, FIG. 13 depicts a pairing code display that is shown to the user. The user must use this code to link the extended reality application module 70 with the multi-channel communications subsystem 50. This pairing code is used by the extended reality application module 70 to subscribe to messages on a specific channel to receive messages destined for that specific pairing code from the message broker of the multi-channel messaging subsystem.

3. The pairing code is used to uniquely identify the conversation so that other components which subscribe to commands, properties and messages via the multi-channel communications subsystem sent on the channel identified by this pairing code can all receive the same messages.
4. When the user initiates the rendering of the asset 269, using the cross-platform game engine 71 of the extended reality application module 70, and enters the pairing code, the system 100 subscribes the environment controller 75 to commands, properties and events sent on the channel identified by the pairing code, and then enters a "wait state", awaiting further interaction.
5. If the user was already in a conversation, a command is sent from the message broker, on the channel of that conversation, via the multi-channel messaging subsystem 50, to the cross-platform game engine 71, requesting that the asset be loaded thereon 268.

In an embodiment, to make this request the multi-channel messaging subsystem 70 sets a "Part Number" property of the desired asset followed by a "Load asset" Command to the environment controller component item 75 on the channel identified by the pairing code. The environment controller responds to the "Load asset" command by sending a GET request to the web server 20 to download the requested asset stored in the CMS 60 (or asset bundle which was stored in the CMS 60 during the above-mentioned file Conversion process), which it then loads into the virtualized 3D environment of the game engine 71 for display and interaction within the extended-reality display device 80. When loaded, the asset itself subscribes to commands, properties and messages by calling the method AppStart(partNumber), (as depicted in the AppStart method of FIG. 20) so that each asset referenced by the variable "partNumber" can respond individually to commands, properties and events communicated on the channel.

Given that, as previously stated, an asset has a unique Part Number associated therewith, this Part Number can be used to route commands and/or properties to the unique part, in the context of a conversation. A non-limitative example of setting a property on an asset that had been previously loaded by the environment controller into the game engine 71 would be changing the opacity of an asset by setting a transparency property of the asset using its specific Part Number.

The following code segment demonstrates C# code that uses the reactive protocol CommXR 51 to set the transparency of a Bicycle front tire to 50%:

```
CommXR client = new CommXR( );
client.AppStart("FrontTire"); // Send commands to front tire asset
client.Join("JAOIO"); // Set the PAIRING CODE to JAOIO
client.Set("transparency", 50);
client.AppEnd( );
```

The above code when executed on any device capable of running the C# code and connected to the multi-channel messaging subsystem 50 would cause transparency to be set on all devices that had this part listening for this property change.

An example of the code required for the asset to "listen" for this property while running in the 3D game engine 71 is provided as follows:

```
CommXR client = new CommXR( );
client.AppStart("FrontTire"); // Send commands to front tire asset
client.Join("JAOIO"); // Set the PAIRING CODE to JAOIO
// Listen for messages that change the transparency property
// ONLY on this part, ONLY on this PAIRING CODE channel
client.OnPropertyChange("transparency", (c, v) =>
{
    Invoke(new Action(( ) =>
    {
        transparency = v;
    }));
});
```

In an alternate embodiment, assets could be identified as a group so that by specifying a "wildcard" symbol such as an asterisk (*) as the Part Number, a multiplicity of assets could have the same properties or commands routed to all, with a simultaneous affect.

When an asset is visible to a user via the extended reality display device 80, the default behaviour of the cross-platform game engine 71 is to create a basic "scene" (unless user is launching a scene) by loading a default scene. This scene can be titled by the user using the extended reality display device 80.

In an embodiment, the user can request that specific assets be loaded by triggering any acceptable ALU, by calling the web server 20 with a GET command, or by sending commands via the channel back to the web server 20 by way of a graphic user interface displayed in the extended reality display device 80.

In an embodiment of the present invention, a fixed multi-asset scene can be generated. The fixed multi-asset scene can be created by loading the assets using an ALU or by sending commands via the channel to the web server 20. The user can also use the various controllers available in their corresponding extended reality environment to move, modify, resize, rotate and otherwise reposition the items in their view. Scenes can be saved to a user account and reloaded at whim using again, an ALU.

In an alternative embodiment, an animated multi-asset scene can also be created. The animated multi-asset scene can be created by loading the assets in the scene using an ALU or by sending commands via the channel. The assets are positioned and the properties of the assets are edited in order to create the animated multi-asset scene.

In an embodiment, movement constraints along size degrees (right, left, up, down, roll, yaw and pitch) can be assigned to the assets by specifying allowable ranges of movement. The linking constraints can also be assigned between assets to cause actions to one asset to be translated into movement of the other asset. The relative positions of parts can be sequenced into steps by storing their positions in a sequence table in relation to a SMPTE time code or in an alternate embodiment the number of milliseconds since start.

Animations of the movements from one sequence step to another can be controlled by game engine scripts. In one embodiment of the present invention, any commands, properties or events that can be accessed by the user through any of the available user interfaces using the extended reality application module 70 can be both received and transmitted through the multi-channel messaging subsystem 50 to coordinate views of the same animations in a multiplicity of extended reality display devices 80, simultaneously.

In one embodiment of the present invention the user can, within the extended reality display device 80, use controls to change the appearance of any asset, including color, materials and or textures used to display the asset.

In another embodiment of the present invention, the user can assign properties to an object of an asset, to control its display. These properties can be modified through setting properties corresponding to that asset, using the multi-channel messaging subsystem 50. In an embodiment, the properties of an object of an asset can be controlled by processes external to the system 100. For example and without being limitative, in an embodiment, an aircraft data buss could be connected to the system 100 to send its real-time data to the multi-channel messaging subsystem, which would route this data to property of any asset or user interface component that had been subscribed as responding to that property. For example, a label that had been assigned the property of "engine speed" could respond to the corresponding change in that property in the aircraft data buss by displaying the engine speed within the 3D environment.

In an embodiment, a scene state can be stored similarly to assets and can be moved to a branch in a collection. In an embodiment, a common branch would be one called "Scenes".

In an embodiment, scenes can be loaded and run by clicking an ALU in an interactive technical publication. The ALU could have a structure identical to the above described ALU related to an asset. Hence, a procedure almost identical to the procedure described above when clicking an ALU, is performed when the ALU is clicked, with the exception that a scene rather than an asset is loaded. In the present invention, a scene can be represented as a single asset with an associated Part Number. In such a case, the scene can be uploaded to the CMS using a similar procedure to the "Add Asset" procedure described above, with the exception that the add asset procedure is controlled by the extended reality display 80 device. Any scene ALU can thus be embedded in a technical document in the same way as any other asset stored in the system.

A scene can consist of one or more of the following items:
A list of all assets contained within the scene.
All relative start positions for the assets contained within the scene.
Specific properties assigned to the asset that are relevant to the present scene which can include:
Constraint properties associated with the asset.
A "pin" property of the asset causing it to be pinned in space so that it no longer moves in relation to other assets.

Any properties of the asset or component assets that are defined by the game engine.

An opacity property.

A selection property. Individual assets can be selected and the selection indicated by a change in color, material, size or position.

An Asset Tree of categories mapping each asset to a different branch of the tree.

A list of hyperlinks associated with Pins, Numbers, Buttons and Assets can be called up on a grid so that Editors can adjust easily the links and what they trigger.

A "branch breadcrumb list" stored in Tags to dynamically build Asset Trees in the scene.

A data table acting as a timeline of sequence of relative positions of the assets as they change over time.

A root position that all assets are stored relative to.

A common zoom factor for assets in their initial state.

One or more lights which can be of a variety of types, position, color and intensity.

An internal map of the relationships and motion constraints between parts that maps which parts join with which other parts and which motion is acceptable and within which range.

A common set of scene control commands which include but are not limited to Adjust lighting intensity, Set lighting color, Rotate, Explode Parts, Collapse.

The assembly can be viewed from a variety of viewpoints including Isometric, Front, Left, Right, Side, Bottom.

Allow movable assets to be moved.

Hazard and Warning message.

In one embodiment of the present invention, the computer 10 when running an IETM (interactive electronic technical manual) or IETP (interactive electronic technical publication) application can include a client capable of subscribing to communications events, commands or property changes using the reactive protocol CommXR component 51.

Commands can be sent to the IETP or IETM application by addressing the user logged into the system by concatenating the name of the app with the user id to form an AppName. For example, if the user is John Doe and his user id is 614, and the IETP application is called IETP, then the part name "IETP-614" would uniquely identify the user's IETP and allow commands, events and properties to be sent from the extended reality application module 70 to the application.

In an embodiment, a software application can read a multiplicity of controller devices, such a, for example and without being limitative, consumer game controllers, joysticks, digital knobs, and midi controllers. The software application can convert the values read from the controllers to properties, command and event triggers in the multi-channel messaging subsystem 50, which in turn can be mapped to assets shown in the extended reality display device. Hence, external physical controls can be used to control the virtualized 3D environments.

Figure 14:
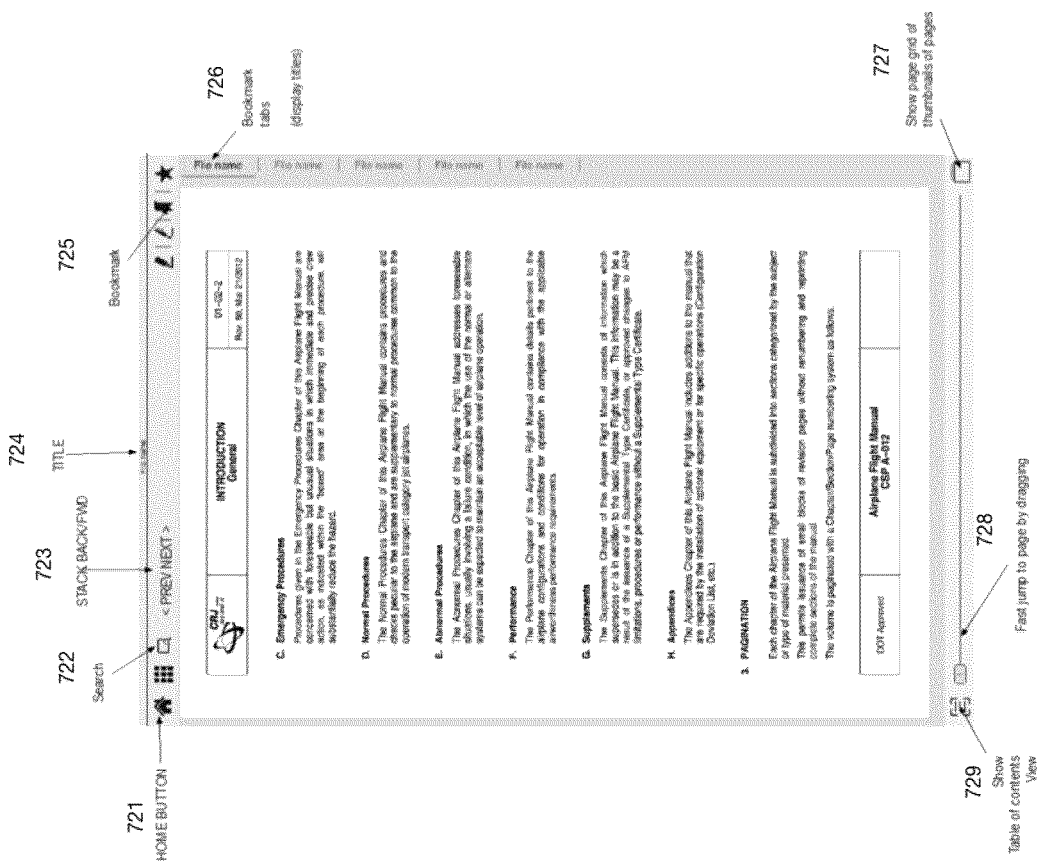
FIG. 14 is a user interface 3D model of a PDF/HTML document viewer, displayed front view, in accordance with an embodiment.

Referring to FIG. 14, in an embodiment, the extended reality application module 70 includes the PDF/HTML viewer app connected to the multi-channel messaging subsystem and the Internet. The PDF/HTML viewer app is configured to display PDF and web pages in the virtualized 3D environment. Hyperlinks clicked inside the virtualized 3D environment, using the PDF/HTML viewer app can trigger a variety of changes including:

The PDF view can switch to a web view when a hyperlink to a web page is clicked.

A web view can switch to a PDF view which a hyperlink to a PDF document is clicked.

A web view can hyperlink to another page or part of the same page.

A PDF view can switch to another PDF document or to another page of the same document.

A hyperlink in either PDF or web view that contains an ALU will cause an asset or scene referenced by the ALU to be loaded into the environment.

If the user facing the hyperlink ray cast touches the hyperlink in either PDF or web view, the equivalent of a web browser "hover" is sent to the browser which in one embodiment will cause a 3D thumbnail of the asset to be displayed.

A communications subsystem protocol command in an HTTP format when clicked as a hyperlink can cause commands to be sent via the communications subsystem to any other component listening on the same channel.

In an embodiment PDF/HTML viewer app includes several correlated features including:

The ability to display a PDF file or HTML document as shown in FIG. 18.

A next/previous stack to allow users to go back and forth to the previous document (regardless of whether the document was of a different type) 723.

Display the title of the document 724.

Store and reference a bookmark to a specific page 725.

Tabbed access to quickly switch to previously viewed documents 726.

Display a table of contents view 729.

Change page quickly using a slider bar or slider thumbnails 728.

Search for text within the document 722.

All controls "clicked" by user can send messages on a communications channel (using the multi-channel messaging subsystem 50) so that other extended reality display devices 80 connected with the same channel can mirror the function. For example, clicking the page slider to turn pages would cause the same page to turn on another device. In an embodiment, this mirroring of communications can be turned off or on as required.

In an embodiment, the rules engine 34 is configured to add rule scripts that monitor properties and control scene and asset parameters in real-time. To perform such functions, the rule engine 34 can be configured such that the multi-channel messaging subsystem 50 used to control assets in the extended reality environment is connected to the rule engine 34 using the reactive protocol 51 referred herein as CommXR. Hence, when a conversation begins, the rule engine 34 can subscribe to a conversation using the reactive protocol 51 and rule engine 34 can therefore subscribe to the same properties that are subscribed by 3D assets loaded in the cross-platform game engine 71 and rendered in the virtualized 3D environment. Therefore, changes to the properties can be instantly sent to the rule engine 34 causing it to trigger an event.

For example and without being limitative, this allows warning messages for hazardous conditions like standing next to a running engine, which can popup automatically in the scene when certain properties go "out of a preset range".

Another example of this would be a throttle control asset in a 3D environment that when moved to 100% causes an engine-power property to be set to 100%. A user-created rule in the Rule Engine 34 could fire that state when engine-power=100% then engine-speed in a separate engine asset is set to 20,000 rpm. Another rule could state that "when engine-speed>1000 rpm" show a hazard warning display.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

What is claimed is:

1. A system for displaying an asset of an interactive electronic technical publication synchronously in a plurality of extended reality display devices, the system comprising:
   a computer having a display displaying the interactive electronic technical publication with a reference to the asset;
   a content-management system storing the asset referenced in the interactive electronic technical publication;
   a multi-channel messaging subsystem comprising a key-value server and a subscription manager together defining a message broker and using a reactive protocol component allowing clients to subscribe to a channel associated to a conversation, the reactive protocol component used by the message broker allowing sending and receiving messages containing at least one of commands, events and property value changes relative to the asset referenced in the interactive electronic technical publication, with the messages being communication vessel using key-value pairs where the key of each one of the key-value pairs identifies the channel, the asset and the at least one of the commands, the events and the property thereof and the value of each one of the key-value pairs identifies a value to which the key is to be changed to;
   an extended reality application module including a cross-platform game engine generating a virtualized 3D environment displayable on the plurality of extended reality display devices for rendering the asset referenced in the interactive electronic technical publication and loaded into the cross-platform game engine, the extended reality application module being configured to subscribe to the channel associated to the conversation, to communicate messages corresponding to that channel with the message broker of the multi-channel messaging subsystem;
   wherein the plurality of extended reality display devices are connected to the extended reality application module and display the virtualized 3D environment generated by the cross-platform game engine thereof, the plurality of extended reality display devices subscribing to the channel associated to the conversation.

2. The system of claim 1, wherein the reactive protocol component used by the message broker of the multi-channel messaging subsystem allows multi-directional communications between the plurality of extended reality display devices, with the display of the asset of the interactive electronic technical publication remaining synchronized therebetween.

3. The system of claim 1, further comprising a web server connected to the content-management system, the multi-channel messaging subsystem and the extended reality application module, the web server running web services allowing to add assets to the system, to manage conversations occurring via the multi-channel messaging subsystem, and to request assets from the content management system.

4. The system of claim 1, wherein the channel associated to the conversation is characterized by a unique pairing code, usable by the clients to subscribe to the channel.

5. The system of claim 3, wherein the interactive electronic technical publication includes at least one asset locator URL, the asset locator URL operating as a trigger for loading the asset referenced in the interactive electronic technical publication into the cross-platform game engine of the extended reality application module.

6. The system of claim 5, wherein the at least one asset locator URL includes information for identifying the web server for accessing the asset and information to identify a unique code associated to the asset referenced by the interactive electronic technical publication.

7. The system of claim 1, wherein the extended reality application module further comprises an environment controller performing subscription to the channel associated to the conversation and communicating the messages corresponding to that channel with the message broker of the multi-channel messaging subsystem.

8. The system of claim 2, further comprising a web server connected to the content-management system, the multi-channel messaging subsystem and the extended reality application module, the web server running web services allowing to add assets to the system, to manage conversations occurring via the multi-channel messaging subsystem, and to request assets from the content management system.

9. The system of claim 2, wherein the channel associated to the conversation is characterized by a unique pairing code, usable by the clients to subscribe to the channel.

10. The system of claim 3, wherein the channel associated to the conversation is characterized by a unique pairing code, usable by the clients to subscribe to the channel.

11. The system of claim 4, wherein the interactive electronic technical publication includes at least one asset locator URL, the asset locator URL operating as a trigger for loading the asset referenced in the interactive electronic technical publication into the cross-platform game engine of the extended reality application module.

12. A computer implemented method for displaying an asset of an interactive electronic technical publication synchronously in a plurality of extended reality display devices, the method comprising:
   uploading and storing the asset referenced in the interactive electronic technical publication;
   creating a conversation relative to that asset and shared by the plurality of extended reality display devices, the conversation being created by a message broker using a reactive protocol component allowing the plurality of clients to subscribe to a channel associated to the conversation and sending and receiving messages containing at least one of commands, events and property value changes relative to the asset referenced in the interactive electronic technical publication;
   for each message, generating key-value pairs where the key of each one of the key-value pairs identifies the channel, the asset and the at least one of the commands, the events and the property thereof and the value of each one of the key-value pairs identifies a value to which the key is to be changed to;

generating a virtualized 3D environment rendering the asset referenced in the interactive electronic technical publication and displayable on the plurality of extended reality display devices, using an extended reality application module;

subscribing the extended reality application module to the conversation to communicate messages corresponding to that channel with the message broker; and displaying the virtualized 3D environment on the plurality of extended reality display devices, the plurality of extended reality display devices subscribing to the channel associated to the conversation and allowing multi-directional communications therebetween over the channel.

13. The method of claim 12, further comprising displaying the interactive electronic technical publication with a reference to the asset on a display of a computer.

14. The method of claim 13, further comprising triggering the generation of the virtualized 3D environment rendering the asset referenced in the interactive electronic technical publication through selection of an asset locator URL included in the interactive electronic technical publication.

15. The method of claim 13, wherein the channel associated to the conversation is characterized by a pairing code, the method further comprising the step of inputting the pairing code by a user in one of the plurality of extended reality display devices or the computer to subscribe the extended reality application module to the conversation.

16. The method of claim 15, wherein the method further comprises the step of inputting the pairing code by users in each corresponding ones of the plurality of extended reality display devices or the corresponding computer to subscribe each one of the plurality of extended reality display devices to the channel associated to the conversation.

17. The method of claim 14, wherein the channel associated to the conversation is characterized by a pairing code, the method further comprising the step of inputting the pairing code by a user in one of the plurality of extended reality display devices or the computer to subscribe the extended reality application module to the conversation.

* * * * *